United States Patent [19]

Hayes, Jr. et al.

[11] 3,886,298

[45] May 27, 1975

[54] METHOD FOR PREPARING MEATLIKE FIBERS

[75] Inventors: John T. Hayes, Jr., North Tarrytown; Robert Tewey, Dobbs Ferry, both of N.Y.

[73] Assignee: General Foods Corporation, White Plains, N.Y.

[22] Filed: Nov. 24, 1972

[21] Appl. No.: 309,328

[52] U.S. Cl. ............... 426/656; 426/448; 426/506; 426/507; 426/802; 426/104 426/657

[51] Int. Cl. ............................................. A23j 3/00

[58] Field of Search ........... 426/364, 448, 350, 506, 426/507, 516, 517

[56] References Cited
UNITED STATES PATENTS

| | | | |
|---|---|---|---|
| 3,142,571 | 7/1964 | McAnelly | 426/141 |
| 3,488,770 | 1/1970 | Atkinson | 426/104 |
| 3,496,858 | 2/1970 | Jenkins | 426/364 |
| 3,684,522 | 8/1972 | Anker et al. | 426/364 X |
| 3,814,823 | 6/1974 | Yang et al. | 426/364 X |

Primary Examiner—James R. Hoffman
Attorney, Agent, or Firm—Daniel J. Donovan

[57] ABSTRACT

Expanded texturized protein products are prepared which are less spongy, have decreased water hydration characteristics and a more fibrous aligned meatlike appearance by feeding a proteinaceous dough through a heated channel of decreasing volume to simultaneously compress and heat coagulate the dough and recovering the heat coagulated product while maintaining pressure drop below 500 psi preferably below 200 psi.

8 Claims, No Drawings

METHOD FOR PREPARING MEATLIKE FIBERS

BACKGROUND OF THE INVENTION

1. Field of the Invention

The present invention relates to producing food products of a fibrous nature and more particularly to an extrusion process for preparing denser, less spongy proteinaceous material having a fibrous or lamellar structure which is continuous and oriented parallel to the direction of extrusion, simulating the muscle of animals or flesh of fish.

2. Description of the Prior Art

The food industry for many years has attempted to provide high protein, low cost fibrous proteinaceous material as a substitute for meat. Meat systems in a simplified form have been considered to be comprised of a system of fibers held together by a suitabe binder. Thus, synthetic textile fiber technology was applied to the preparation of protein fibers which later may be formed a single meatlike mass employing a suitable binder. A recent example of binding spun fibers are U.S. Pat. Nos. 3,498,793 and 3,559,561 issued to Page, et al. A protein solution is forced through spinnerettes into an acid bath forming fibers. The spun fibers are then compressed into a solid mass and bound to resemble natural meat products derived from the muscle of animals.

The basic patent giving means of spinning proteinaceous fibers is Boyer, U.S. Pat. No. 2,682,466, issued June 29, 1954. Since then, numerous patents have issued using spinnerettes.

While spinning techniques produced satisfactory fibers and when bound acceptable meat products, extensive equipment investment and careful control of processing variables is required with the resulting disadvantage that the final products produced are relatively expensive.

A means of producing fibrous protein without employing spinning techinques is Rusoff, et al., U.S. Pat. No. 3,047,395 issued in 1962. Rusoff discloses rapidly heating a protein paste or slurry, either animal or vegetable, in a finely divided state to a temperature of 300° to 400°F under continuous agitation to cause coagulation of the protein into a fibrous mass. Rapid cooling of the protein results in a shredlike fibrous material which is recovered at rather low yield.

Recent techniques have been devised for producing a low cost, expanded vegetable protein material for use as a meat substitute. Proteins such as soy are subjected to elevated temperature and high pressure and forced through a die to produce a puffed mass or rope of proteinaceous material. The sudden expansion from high pressure to atmospheric pressure causes an expansion which produces the appearance of fibers. Illustrative of these techniques are Atkinson, U.S. Pat. Nos. 3,480,442 and 3,488,770 and Jenkins, U.S. Pat. No. 3,496,858.

Another technique for forming meatlike products is taught by McAllister, U.S. Pat. No. 3,102,031, wherein a gluten dough is utilized to produce an uncooked hamburg-like granule. The present invention is considered to be an improvement over these prior art patents particularly those that simulate meat products by expansion from an extruder as in the Atkinson and Jenkins patents previously discussed.

SUMMARY OF THE INVENTION

This invention produces low cost, denser, fibrous, expanded, high protein materials resembling the muscle of animals or flesh of fish. The fibrous proteinaceous material has a more meatlike appearance and texture than offered by current high pressure extrudates and provides a simpler and less costly process than possible employing spun protein and provides much greater yields of fibrous product than obtained by employing a slurry as in Rusoff.

The present invention involves the compression and orientation of a high protein material followed by the simultaneous orientation and coagulation of the material into fibers. Orientation and coagulation of the protein is accomplished simultaneously so as to coagulate or heat-set the protein as it elongated and formed into a dense, shred-like or fibrous, expanded condition. This is accomplished by compressing a dough of heat-settable protein in a chamber of decreasing volume, so that the pressure resulting from the reduction in volume, forces the dough in a direction of the chamber outlet and simultaneously densifies and presses the dough against a heated surface thereby heat coagulating the protein and forming thermally irreversible fibers as the dough is elongated and aligned. This invention provides an expanded aligned, thermally irreversible, fibrous meatlike material which is less spongy and more aligned than commercially texturized vegetable proteins.

While the orientation and heat-setting employed in the present invention is related to principles set forth by Rusoff, et al., the yield of final fibrous material is signifcantly improved. The product of this invention is a distinct improvement over McAllister, et al., Atkinson or Jenkins in that the proteinaceous material is extremely fibrous in nature resembling that obtained by employing spinning techniques.

DETAILED DESCRIPTION OF THE INVENTION

Meatlike fibers of the present invention are prepared by subjecting a moist, heat-settable proteinaceous material to simultaneous compression, heat setting and elongation to form a continuous fibrous structure which may be further processed by drying, hydrating or by other art recognized techniques to produce a meat or fish substitute useful in processed foods.

A moist dough of coagulable proteinaceous material is compressed into a unitary body within a chamber of decreasing volume formed by a heated outer wall and an internally rotating auger. The pressure exerted by the reduction in volume of the chamber forces a compaction of the protein while the rotating auger aligns the protein parallel to the direction of extrusion. Simultaneously, the heated outer wall transfers sufficient heat to the compressed and elongated mass of protein to plasticize and heat set the material into a dense continuous fibrous mass which is ejected from the chamber. The clearance between the heated surface, normally cylindrical or conical in nature, and the rotating auger is adjusted to quickly heat throughout, stretch and orient the proteinaceous mass.

Pressure is necessary to compact the proteinaceous material to a point where it is substantially free of voids and to ensure rapid heat transfer from the heated surface to the proteinaceous material. The pressure is maintained by reducing the free volume within the extruder thus forcing the material through the extruder. The fibrous nature of the protein is formed, at least in part, within the extruder and does not require the large pressure drop across a die to develop the appearance of fibers as well as developing a characteristic sponginess so typical of the prior art products of Atkinson and Jenkins. The extruder chamber reduction also provides a frictional resistance to the flow of proteinaceous material which causes elongation of the material in the direction of extrusion. As the fibrous nature of the protein is developed, the heat transferred from the heated surface irreversibly sets the protein into a fibrous mass. Where conventional dies are employed the pressure drop to atmosphere from the greatest pressure developed at the feed side of the die is minimized to limit expansion thereby reducing sponginess and to reduce disorientation of the mass and is under 500 psi, preferably less than 200 psi.

The thermally irreversible, dense, continuous, aligned and fibrous, expanded protein material once discharged from the chamber may be dried, hydrated, or cooked by any number of art recognized procedures. The product is useful for foods such as a substitute for meat or fish.

The protein material employed in this invention must contain a minimum percentage of undenatured protein, that is protein that has neither been heat-treated nor otherwise processed to the point where it is no longer coagulable. The protein must also be capable of forming a dough which upon extrusion can form a fibrous structure in which the fiber bundles show a high degree of alignment parallel to the direction of extrusion as opposed to the less regularly oriented fibrous structure occurring in the highly puffed commerical, extruded texturized proteins.

The protein dough, depending on its consistency, may be fed to the extruder in a continuous mass or may be subdivided into discrete particles for convenience in feeding.

The concentration of the protein necessary for fiber formation will vary according to the quality and source of the protein. Raw meat, fish and vegetable protein materials can be employed. SUitable vegetable protein sources are soy bean meal, peanut meal, cottonseed or other vegetable protein materials generally recovered as by-products from oil extraction. Full fat proteinaceous sources may be employed but concentrated sources of the protein material are preferred to maximize the protein content of the dough. The muscle of animals, flesh of fish, soy isolate, gluten, albumen, dairy products such as dry milk powder, whey and the like, wheat flour and other protein sources are useful. Cheap cuts of meat, poultry or fish not having utility for direct sale to consumers such as poultry paste recovered from laying chickens are a preferred source of protein. Proteins such as protein isolates, defatted soy flour and particularly wheat gluten are preferred vegetable derived proteinaceous sources.

Proteinaceous materials are sub-divided and mixed to form a moist dough having a moisture content of between 20 to 65 water, as is basis. Where meat materials are employed, it is necessary to partially dehydrate the meat by known drying methods or mix the meat with dry vegetable protein sources or other materials, to reduce the moisture content required for processing. Of course, heat treatment on drying of meat or fish will cause denaturization and therefore, it is preferred to employ meat only as an additive or supplementary source of protein to dry vegetable protein which will comprise a major portion of the dough.

Gluten is the preferred vegetable-derived protein. It is generally preferred to employ a minimum concentration in the dry mix of about 20 to a maximum of about 75 wheat gluten. The upper limit is dictated by the inability to mix compositions containing a greater amount of gluten while the lower concentration has been found to produce little fiber formation in the absence of other heat coagulable proteins. The lower levels of gluten or no gluten at all may be employed provided the dry weight basis of fiber forming, heat coagulable protein is maintained above 35 by weight.

Other materials may be mixed with the proteins. For example, carbohydrates such as starch fillers, colors, fats and other flavoring ingredients may be added to the proteinaceous material. Wheat flour has been found to be an extremely useful additive since it provides some gluten useful in fiber development and is readily cooked and gelatinized during the process to produce a desirable flavor and texture in the product. However, defatted or whole soy bean flour also provides sufficient carbohydrates and a better protein value in the finished product.

The proteinaceous materials, fillers, and other additives are mixed with water to form a dough. The dough can be a single mass such as that produced in the pastry art or can be particulate such as that produced in the pasta art. The moisture content of the dough may vary within limits of from 20 to 65 by weight but preferably is maintained at about 20 to 49 by weight for doughs containing a major amount of vegetable protein.

It is important to mix the material with water sufficient to as uniformly as possible distribute the water in the proteinaceous material.

The moist proteinaceous dough is subjected to compression in a chamber of decreasing volume formed by a heated outer wall and a rotating auger such that the pressure exerted by the reduction in volume as the outlet of the chamber is approached does not exceed 200 psig at the outlet. The compression forces the dough into a dense unitary body conforming to the chamber formed between the auger and the wall. The compression removes voids, expells air and forms a dense proteinaceous mass. Simultaneously, the compression against the heated outer wall allows rapid heat transfer into the mass plasticizing the mass as it is forced towards the outlet of the extruder. The continuous turning of the auger and the resistance of the heated wall causes an elongation of the plastic mass forming a fibrous texture which is aligned in the direction of extrusion and simultaneously the fibers are heated to the point of fomring a heat irreversible proteinaceous mass.

Formation of the fibers is conveniently done by feeding a premixed dough to an extruder of the type normally employed in the plastics industry having a minimum clearance between the periphery of the auger and the heated wall and preferably having a minimum clearance between the base of the channel formed by the flights of the auger and the heated wall. By this design, there is provided a maximum heat transfer surface area to volume of the protein mass being treated. The auger is designed to decrease the volume of the channel between flights of the auger by 3/2 or more from feed to discharge within the extruder.

The wall is normally heated to a temperature of at least 250°F and preferably to an average temperature of 280°F or greater. It is preferred to employ multiple zones of heat to provide proper temperature control throughout the barrel of the extruder. Thus the first zone near the inlet of the extruder may be heated to at least 250°F and then one or more zones closer to the outlet may be heated to a temperature of 280°F or greater. The heated surface cooks the carbohydrate content of the dough and raises the temperature of the dough to a point where the protein coagulates. Simultaneously, the auger rotating in relationship to the heated wall causes a stretching effect aligning the material as the protein is being coagulated.

The minimum speed of auger rotation is determined by the speed necessary for a given extruder to prevent charring or browning of the proteinaceous material as it is being treated. The exact operating conditions are not critical provided sufficient reduction in volume is available to insure proper compression to a dense mass, stretching and coagulation of the protein. If desired, the auger of the extruder may be heated to further increase the surface area present for a given mass of proteinaceous material, and may be further designed to provide a first mixing stage wherein the temperature of the proteinaceous mass is increased to a point incipient to coagulation whereupon the auger is designed to provide a reduction in volume to compress, stretch and orient the protein during coagulation. The first mixing stage may also be employed to mix ingredients and form the fibrous dough. Thus large amounts of material may be mixed initially in deep flights in an auger an upon formation of the dough and reaching coagulation temperature the volume of the extruder reduced to maximize the heated surface to mass relationship during stretching and coagulation of the protein.

The expanded dense product, prepared by the process of our invention, is substantially less puffed and less spongy than comercially available texturized vegetable protein.

Commercial texturized vegetable proteins have an absolute density of 0.22—0.64 g/cc and a hydration rate of above 2.0 g $H^2O$/g TVP.

The following examples are illustrative of this invention, but not intended to limit it.

EXAMPLE I

A dry blend of ingredients containing by weight, 25 soy grits, 60 vital wheat gluten, 12.6 wheat flour, 2.0 salt and 0.4 cysteine hydrochloride was prepared. The dry ingredients are blended with water to give a doughy mass of 30 (as is) water content. The dough is subdivided and the resulting pellets of material are fed into a Brabender Model 1003 Extruder equipped with a 1.5:1 compression ratio screw (auger) fitted with a 150° torpedo. The screw is operated at 125 RPM. Material is fed into the screw at a rate sufficient to keep it full. The barrel of the extruder is heated to 180°C (356°F) while the die plate is heated to 150°C (302°F). A 3/16 inch diameter die opening is used. The extrudate is recovered and dries at 110°C (230°F) for 4 hours prior to evaluation. The resulting expanded product, when rehydrated in boiling water, simulated chicken white meat in appearance and texture. The dried extrudate, when soaked ½ hour at 50°C, hydrates to 2.0 g. $H^2O$/g. solids. The density is 0.72 g./ml.

The above example is repeated using a 25 moisture dough with similar results. Similarly cysteine hydrochloride is removed and similar results are obtained.

EXAMPLE II

The procedure followed in Example I is repeated but a 5:1 compression ratio screw (auger) and a one-quarter inch diameter die opening are employed. The formulation processed easily to give an expanded product with fibrous texture. The density was 0.74 and the hydration was 1.7 g. $H^2O$/g. solids.

EXAMPLE III

The procedure followed in Example II is repeated using the same formulation and a 5:1 screw operating at 125 RPM with a 150°torpedo. A die having a ¼ diameter opening is employed and heated to 120°C (248°F). The extruder barrel is heated to 150°C (302°F). Doughs having 25, 30 and 35 moisture are extruded with best results obtained at 30 moisture. The resulting products were expanded, having a fibrous texture, a density of 1.30 g./ml (absolute) and a hydration of 1.13 g. $H_2O$/g. solids.

EXAMPLE IV

The same formulation is extruded in a conventional Wenger Model X-25 extruder with short head auger assembly with two hole insert die. The assembly consists of three screw sections (separated by two steamlocks No. 28-324): (a) nose cone screw 28-321, (b) screw No. 28-326, and (c) screw No. 28-330. The nose cone screw was modified by cutting slots back into the flight about 4. There was obtained typical appearing puffed texturized vegetable protein having a density ranging from 0.18 to 0.55 g/ml and a hydration ranging from 2.2 to 3.9 g. $H^2O$/g. solids. These products tend to be spongy with segments of fibrous structure which is randomly oriented relative to the direction of extrusion. The products prepared in Examples I—III are superior in that the resulting Brabender ropes, issuing from the die, are less expanded and possesses a continuous, fibrous structure with a high degree of alignment parallel to the direction of extrusion.

What is claimed is:

1. A process for preparing fibers simulating the muscle of animals or flesh of fish comprising:
    a. preparing a mixture of proteinaceous material and water, said proteinaceous material containing above 35 percent heat coagulable protein on a dry basis, a major amount of said protein comprising vegetable protein and the moisture content of the mixture being from 20 percent –49 percent
    b. blending the mixture to form a dough;
    c. compressing the dough in a chamber formed by the channel of an auger rotating within an outer wall heated to at least 250°F wherein the volume of the channel between flights of the auger is decreased 3/2 or more from feed to discharge of the chamber to degas and densify the dough into a unitary body whereby said dough is simultaneously heated and elongated while under compression into a heat set thermally coagulated fibrous condition
    d. forcing the heat set fibrous dough through a die wherein the pressure drop to atmosphere is less than 500 psi causing expansion of the heat set dough while maintaining the fibrous condition thereof e. recovering an expanded, aligned, fibrous product, said product characterized when dry by having a density of greater than 0.65 g/ml and a hydration of 2g.H$_2$O/g solids or less when soaked one-half hour in water at 50°C.

2. The process of claim 1 in which the proteinaceous material includes defatted soy bean.

3. The process of claim 1 in which the proteinaceous material includes gluten.

4. The process of claim 3 in which gluten comprises about 20 percent to about 75 percent of the proteinaceous material.

5. The process of claim 1 in which the proteinaceous material includes animal protein.

6. The process of claim 1 in which the temperature of said outer wall is 280°F or greater.

7. The process of claim 6 in which said pressure drop is less than 200 psi and the time of heating the dough does not exceed 3 minutes.

8. The process of claim 7 in which the dough contains wheat gluten and soy.

* * * * *

UNITED STATES PATENT OFFICE
CERTIFICATE OF CORRECTION

Patent No. 3,886,298            Dated May 27, 1975

Inventor(s) John T. Hayes, Jr. and Robert Tewey

It is certified that error appears in the above-identified patent and that said Letters Patent are hereby corrected as shown below:

Column 1, line 21, after "formed" and before "a" add --into--.

Column 1, line 47, after "a" and before "fibrous" change "shredlike" to --shred-like--.

Column 3, line 43, after "employed." and before "vegetable" change "SUitable" to --suitable--.

Column 3, line 62, after "20" and before "to" add --percent--.

Column 3, line 62, after "65" and before "water" add --percent--.

Column 4, line 6, after "20" and before "to" add --percent--.

Column 4, line 7, after "75" and before "wheat" add --percent--.

Column 4, line 14, after "35" and before "by" add --percent--.

UNITED STATES PATENT OFFICE   Page 2
CERTIFICATE OF CORRECTION

Patent No. 3,886,298    Dated May 27, 1975

Inventor(s) John T. Hayes, Jr. and Robert Tewey

It is certified that error appears in the above-identified patent and that said Letters Patent are hereby corrected as shown below:

Column 4, line 31, after "20" and before "to" add --percent--.

Column 4, line 31, after "65" and before "by" add --percent--.

Column 4, line 32, after "20" and before "to" add --percent--.

Column 4, line 32, after "49" and before "by" add --percent--.

Column 5, line 44, after "2.0 g" and before "TVP" change "$H^2O/g$" to --$H_2O/g$--.

Column 5, line 49, after "25" add --percent--.

Column 5, line 50, after "60" and before "vital" add --percent--.

Column 5, line 50, after "12.6" and before "wheat" add --percent--.

Column 5, line 50, after "2.0" add --percent--.

UNITED STATES PATENT OFFICE
CERTIFICATE OF CORRECTION

Page 3

Patent No. 3,886,298　　　　　Dated May 27, 1975

Inventor(s) John T. Hayes, Jr. and Robert Tewey

It is certified that error appears in the above-identified patent and that said Letters Patent are hereby corrected as shown below:

Column 5, line 51, after "0.4" and before "cysteine" add --percent--.

Column 5, line 53, after "30" and before "(as is)" add --percent--.

Column 5, line 67, after "g." and before "solids" change "$H^2 0/g.$" to --$H_2 0/g.$--.

Column 6, line 1, after "25" and before "moisture" add --percent--.

Column 6, line 11, after "1.7 g." and before "solids" change "$H^2 0/g.$" to --$H_2 0/g.$--.

Column 6, line 19, after "35" and before "moisture" add --percent--.

Column 6, line 20, after "30" and before "moisture" add --percent--.

Column 6, line 34, after "4" and before "." insert --inches--.

Column 6, line 36, after "3.9 g." and before "solids" change "$H^2 0/g.$" to --$H_2 0/g.$--.

Signed and Sealed this seventh Day of October 1975

[SEAL]

Attest:

RUTH C. MASON
Attesting Officer

C. MARSHALL DANN
Commissioner of Patents and Trademarks